Patented Oct. 16, 1945

2,387,212

UNITED STATES PATENT OFFICE 2,387,212

PREPARATION OF 2-AMINO-THIAZOLE

Edgar C. Britton and Kenneth G. Harding, Midland, Mich., assignors to The Dow Chemical Company, Midland, Mich., a corporation of Michigan No Drawing. Application October 23, 1943, Serial No. 507,476

3 Claims. (Cl. 260—302)

This invention concerns an improved method for the preparation of 2-amino-thiazole.

The compound, 2-amino-thiazole, has heretofore been prepared by reacting ethyl alpha-beta-dichloro-ethyl ether with an aqueous solution of thiourea in accordance with the equation:

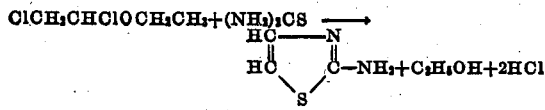

As indicated by this equation, the dichloro-diethyl ether and the thiourea react together to form 2-amino-thiazole and an equimolecular amount of ethyl alcohol. The latter is obtained in aqueous solution and usually in amount such as not to warrant the extra steps which would be required for recovery of the same. Accordingly, the formation of ethyl alcohol represents a loss of a portion of the ether reactant.

We have found that such loss may be avoided by employing, in place of an ethyl alpha-beta-dichloro-ethyl ether, a bis-(alpha-beta-dihaloethyl) ether as a reactant. When such bis-(dihalo-ethyl) ether is used, both halves of the ether molecule enter into the reaction and two molecular equivalents of 2-amino-thiazole are formed per mole of said ether consumed in the reaction. Accordingly, a considerable saving is effected by employing the bis-dihalo-ethyl ether, in place of an ethyl dihalo-ethyl ether, as a reactant. It may be mentioned that the bis-dihalo-ethyl ether is readily prepared by the reaction of a halogen, e. g. chlorine or bromine, with divinyl ether. When using the bis-(dihaloethyl) ether as a reactant, the reaction occurs in accordance with the equation:

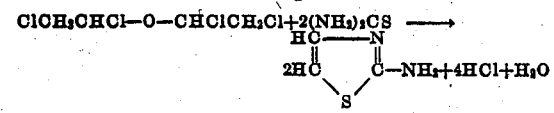

It should be mentioned that, although water is among the products formed by the reaction, the presence of water in the starting materials is necessary in order to initiate the reaction.

Except for the substitution of the bis-dihaloethyl ether in place of the ethyl dihalo-ethyl ether heretofore employed, the reaction may be carried out as usual. For instance, a bis-dihalo-ethyl ether may be added to an aqueous thiourea solution and the mixture be heated to a reaction temperature, e. g. of 90° C. or above, until the reaction is substantially complete. Usually the ether and thiourea reactants are employed in approximately equimolecular proportions, but either reactant may be used in considerable excess if desired. The reaction mixture is usually heated to boiling under reflux at atmospheric pressure, but the reaction may be carried out in a corrosion-resistant bomb or autoclave at higher temperatures, e. g. 150° C. or higher. The reaction is substantially complete when the bis-dihalo-ethyl-ether phase of the reaction mixture has been consumed and is no longer observable. The 2-amino-thiazole product is recovered by conventional procedure.

The following examples illustrate certain ways in which the principle of the invention has been employed, but are not to be construed as limiting the invention:

*Example 1*

A mixture of 19 grams (0.25 mole) of thiourea, 49 grams (0.125 mole) of bis-(alpha-beta-dibromo-ethyl) ether and 100 cc. of water was heated to boiling under reflux for 3 hours, at the end of which time the ether layer of the mixture had disappeared, indicating that the reaction was substantially complete. The mixture was cooled to about room temperature, filtered, and rendered slightly alkaline by treatment with an aqueous sodium hydroxide solution. It was then decolorized by treatment with activated charcoal, and the latter was removed by filtration. The 2-amino-thiazole product was extracted from the filtrate with diethyl ether and was recovered from the extract by distilling off the ether. There was obtained 27 grams of somewhat impure 2-amino-thiazole. The product was recrystallized from ethyl alcohol whereby there was obtained 21.6 grams (0.216 mole), i. e. 86 per cent of the theoretical yield, of substantially pure 2-amino-thiazole.

*Example 2*

A mixture of 207 grams of bis-(alpha-beta-dichloro-ethyl) ether of about 80 per cent purity, 150 grams of thiourea and 700 cc. of water was boiled under reflux for 16 hours. A 260 gram portion of the reaction mixture was evaporated under vacuum, i. e. at about 40 millimeters absolute pressure, to obtain a concentrated residual mixture weighing 68 grams. The 2-amino-thiazole product was extracted from the residue with ether, after which ether was evaporated from the extract. There remained 41.5 grams of somewhat impure 2-amino-thiazole. The theoretical yield of pure 2-amino-thiazole from the 260 gram portion of the reaction liquor would be about 38.5 grams.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making 2-amino-thiazole, the step of reacting a bis-(alpha-beta-dihaloethyl) ether with thiourea in the presence of water.

2. In a method of making 2-amino-thiazole, the step of reacting bis-(alpha-beta-dibromoethyl) ether with thiourea in the presence of water.

3. In a method of making 2-amino-thiazole, the step of reacting bis-(alpha-beta-dichloroethyl) ether with thiourea in the presence of water.

EDGAR C. BRITTON.
KENNETH G. HARDING.